Q. A. SCOTT.
ATTACHING DISCS TO DENTAL PLATES.

No. 170,776. Patented Dec. 7, 1875.

Witnesses:
Alex Mahon
John G. Center

Inventor:
Quincy A. Scott
by A. M. Smith
Attorney

UNITED STATES PATENT OFFICE.

QUINCY A. SCOTT, OF PITTSBURG, PENNSYLVANIA.

IMPROVEMENT IN ATTACHING DISKS TO DENTAL PLATES.

Specification forming part of Letters Patent No. 170,776, dated December 7, 1875; application filed November 29, 1875.

*To all whom it may concern:*

Be it known that I, QUINCY A. SCOTT, of Pittsburg, county of Allegheny, State of Pennsylvania, have invented certain new and useful Improvements in Means for Attaching Atmospheric Disks or Plates to Dental Plates, of which the following is a full, clear, and exact description, reference being had to the accompanying drawing, making part of this specification, in which—

Figure 1:
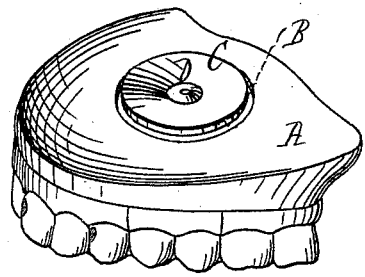
Figure 2:
Figure 3:
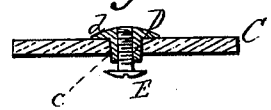

Figure 1 represents a perspective view of a dental plate with disk applied. Fig. 2 is a longitudinal section of the same; and Fig. 3 is an enlarged section through the disk and nut, also showing the screw.

Similar letters of reference denote corresponding parts in all the figures.

The invention relates to that class of dental plates which are held in the mouth by means of a flexible atmospheric disk or plate, secured to the face of the dental plate.

By the ordinary method of securing these atmospheric plates to dental plates the wearer was subjected to difficulty and annoyance, caused by the fact that when the disk became worn, and it was desired to renew or to clean the same, it was necessary to take it to the dentist for that purpose.

My invention has for its object the remedying of the above-named defects; and consists in making the atmospheric disk or plate removable, said disk or plate being secured to the dental plate by means of a screw and nut, which adapts it to be readily removed and replaced by the wearer, as explained.

In the accompanying drawing, A represents the dental plate, made of any desired material, and having a circular recess formed in its face for receiving the holding disk or plate. C is the disk, which, in this instance, is made of rubber; but any other desired flexible material may be used. It is provided with a central perforation, c, in which the lower end of a nut fits, and D is a circular nut, which is enlarged or provided upon its end with a projecting lip or flange, *d*. The plate A is provided with a perforation, *a*, centrally of the recess B, in which the lower end of the nut D, after it has been passed through the disk or plate, fits, the enlarged head or flange *d* preventing its being drawn through the perforation. E is a screw or bolt, to which the nut D is connected.

The manner of securing the disk to the dental plate is as follows: The disk or plate C being set in the recess B, with the perforation *c* placed directly over the perforation *a* in the dental plate, the nut is then placed in the perforations, the enlarged head resting upon the face of the disk, the screw E being inserted and turned into the nut from the opposite side of the dental plate, the dished or cup form given to the disk being regulated by tightening or loosening the screw.

When it is desired to renew or clean the disk where rubber is used, by simply loosening the screw, the rubber can be stretched or drawn over the head of the nut, and a new disk substituted in the same manner.

Having now described my invention, I would state that I do not limit myself to the form of atmospheric plate, or screw and nut, shown and described, as different forms may be used, and the atmospheric plate may be applied to different points of the dental plate without departing from my invention.

What I claim as new, and desire to secure by Letters Patent, is—

1. The combination, with a dental plate, of a removable atmospheric disk or plate, for the purpose and substantially as described.

2. The atmospheric plate, attached to the dental plate by means of the screw and nut, substantially as described.

QUINCY A. SCOTT.

Witnesses:
J. E. HUNTINGTON,
W. H. PERRY.